Sept. 29, 1959     L. D. TRUAX     2,906,403
FILTERING DEVICE
Filed Aug. 30, 1957
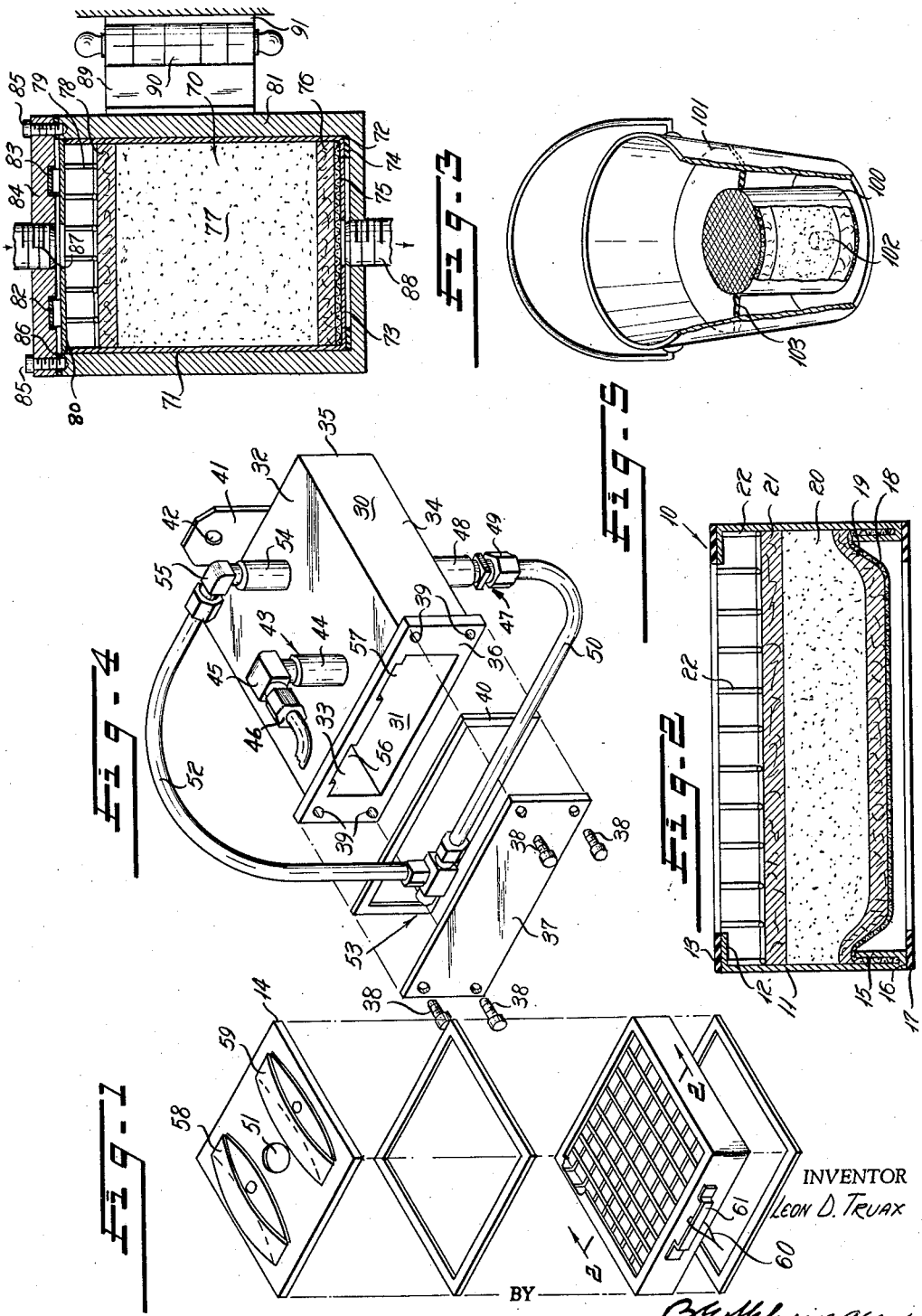
INVENTOR
Leon D. Truax
BY
B. E. Schlesinger
ATTORNEY

United States Patent Office 2,906,403
Patented Sept. 29, 1959

2,906,403
FILTERING DEVICE
Leon Dexter Truax, Dillon, S.C.

Application August 30, 1957, Serial No. 681,302

7 Claims. (Cl. 210—447)

The present invention relates generally to filters and more particularly to filters utilizable with fluids, particularly oil, which have become unsuitable for further use because of foreign bodies contained therein.

With the ever increasing utilization of modern machinery on farms in this country and their consequent dependence upon internal combustion engines for power it has become an increasing problem due to the relatively high cost of oils to provide these farm machines with new or reclaimed oil. Tractors, for example, now require frequent oil change. Replacing old oil with new can become quite costly if the tractor is in continuous service.

Efforts have been made heretofore to provide oil filtering devices mounted upon such vehicles near such engines to maintain a relatively clean supply of oil to these power plants. However, due to excessive costs, these filters in most instances are not available on farm machinery.

In a like manner many automobiles are not supplied with means for filtering the oil which is utilized in their power plants, and those which are so supplied are usually furnished with relatively large "bucket" type filter containers which present many problems when attempt is made to remove and/or replace the filter element thereof. It is usually necessary when such a filter is opened to discard the filter element therein and substitute a new one therefor. Many difficulties have also been encountered in removing the sludge or excess oil which remains in the hard to reach bottom areas of these filters.

Further, with the advent of lower and lower modern automobile design, engine compartment space is at a premium, with many of the older type components, including oil filters, being excessively large therefor.

It is, therefore, an object of this invention to provide a fluid filtering device which is particularly adapted to be installed on farm type machinery by the individual owners thereof with a minimum amount of expense and difficulty.

It is a further object of this invention to provide a filtering device which is, because of its extremely narrow or flat configuration, adapted to be installed in the forward engine compartments of lower modern cars.

It is a further object of this invention to provide an oil filtering device wherein the filter element may be easily removed, cleaned and reinserted in a usable condition within its housing with a minimum of effort.

Additionally, a feature of this invention is to provide an oil filtering device which is easily accessible and which provides for foolproof horizontal insertion of its filtering element.

An additional object of this invention is to provide a filtering device wherein after the filtering element has been removed the filter housing may be readily cleaned of any sludge that may remain therein.

It will thus be seen that an extremely simple, foolproof, and inexpensive device is provided which can be easily installed by the rural resident with a minimum amount of tools, and scientific experience.

Manifestly, a filtering device as disclosed herein may be disassembled and the filter element removed, easily cleaned and reinserted for further use. It is noted in this regard that the device has proven highly successful in maintaining a clean, abrasive-free oil system in a modern automobile which was driven for more than 80,000 miles without an oil change. During this time it was of course necessary to add additional amounts of oil periodically, however, the oil that remained in the system was so clean as to not require a complete change thereof.

Other objects in addition to the aforementioned will be readily apparent hereinafter and the results thereof will be more clearly understood by reference to the following description which is to be limited only by the claims appended hereto.

In the drawings:

Fig. 1 is a fragmentary perspective view of the filter element of the present invention including the pressure plate and appropriate sealing gaskets;

Fig. 2 is a cross-sectional view of said filter element but omitting the pressure plate;

Fig. 3 is a cross-sectional view of a filter of the invention shown hingedly mounted on a fire wall or the like;

Fig. 4 is an exploded perspective view of a preferred embodiment of the invention;

Fig. 5 is a fragmentary pictorial representation of one method of utilizing the filter element of the present invention.

Referring now to the drawings by numerals of reference, in Figs. 1 and 2 10 denotes generally a filter element which is a part of this invention which consists of a can 11 open at both ends, and which can be either square or circular or the like in configuration. The edges of can 11 have been bent over at the upper end thereof to provide flange 12 which provides a sealing shoulder for gasket 13 positioned between flange 12 and pressure plate 14 when the filter element is inserted in the housing 30. The opposite ends of can 11 have been bent back upon themselves as indicated generally at 15 to provide a shoulder 16 for sealing gasket 17 which is positioned between this shoulder and the lower surface 31 of the housing and to provide a firm securing means for engaging and holding a fine mesh wire screen 18 across the bottom of the can.

Placed adjacent or upon this fine mesh wire screen, which may advantageously be of 120 mesh, is a heavy cloth 19 member which may be of thick material such as felt or the like. Positioned within can 11 and supported at its lower surface by cloth member 19 is a quantity of sand 20 which should be substantially pure and free from foreign material. Resting on top of this quantity of sand is heavy cloth or felt member 21 which is identical in composition with cloth member 19 and which is maintained in position in the can 11 by a heavy wire open mesh screen 22. This heavy open mesh screen is frictionally engaged within can 11 and also frictionally engages the surface of felt or cloth member 21 to hold it and the sand in can 11. Screen member 22 is press fitted into the opening in can 11 and the flanges 12 also aid in retaining the screen's felt cloth and sand in the can 11.

Referring now to the housing shown generally in Fig. 4 it will be seen that there has been provided a substantially flat housing 30 having a top 32, a bottom 31, side members 33 and 34 and rear wall 35.

Secured to the peripheral edges of the opening in the open end of housing 30 is a flange member 36 which is welded to or otherwise sealingly secured to said periphery and which extends beyond said peripheral edges to provide a substantially flat flange surface whose plane is in the plane of the opening of the end housing 30. Manifestly this flange member has an aperture through the central portion thereof to allow entry of the filter element as will be described hereinafter.

Adapted to sealingly close off the open end of housing 30 is closure plate 37 which is secured to the flange member by means of removable bolts 38 which are engaged in apertures 39 in flange member 36. To provide a sealing engagement between these members there is provided a gasket 40.

Secured to the rear wall 35 of housing 30 is bracket member 41 which is preferably welded to said back member and which is provided with suitable aperture 42 for mounting said housing upon a fire wall or the like of an automobile or other vehicle.

In the top 32 of housing 30 there is provided a fluid ingress means indicated generally at 43 which consists of a coupling sleeve 44 which is secured to a base element (not shown) by screw threads and which is adapted to threadedly receive right angled coupling member 45 to which is connected the ordinary fluid coupling conduit 46.

Underneath housing 30 and attached to bottom wall 31 in a similar manner is fluid egress means indicated generally at 47 and which is composed of a coupling sleeve 48 similar to coupling sleeve 44 and fluid coupling structure 49 by which fluid conduit 50 is attached to said housing.

Once filter element 10 has been inserted into housing 30 it will be seen that oil or fluid entering the housing through ingress structure 43 will be contained in said housing above said filter element. This fluid is prevented from flowing down past the shoulder 16 of filter element 10 by means of gasket 17 and the pressure in the system will force the fluid through aperture 51 in pressure plate 14 thus forcing the fluid to travel through the filtering elements including the screen 22, felt 21, sand 20, felt 19 and fine wire mesh 18 out through the bottom of the can of said filter element to egress means in the bottom of said housing as described hereinabove.

To provide for means to circumvent said filter when it may be filled with sludge or the like so that it becomes impassable to fluids, there is provided a bypass system consisting of a bypass conduit 52 which is connected into fluid egress conduit 50 by means of conventional coupling units indicated generally at 53.

The other end of this bypass conduit is connected to a separate aperture in the top 32 of housing member 30 by means of structure which is identical to fluid ingress structure 43 and which consists of a coupling sleeve 54 which is threadedly secured to a base member attached to the upper surface of housing 30 (not shown). Connecting bypass conduit 52 to said coupling sleeve 54 is right angled coupling structure indicated generally at 55.

Thus, when the filter becomes clogged as aforementioned the fluid will be able to pass out of said housing and back into the conduit system by means of bypass conduit 52 which, it will be seen, bypasses the structure of the filter element 10.

To provide means for easily inserting filter element 10 within housing 30 while at the same time exerting sealing pressure on gaskets 13 and 17 to provide a sealed oil system there is provided in the top 32 of said housing inwardly opening channels 56 and 57.

Mounted on the top of pressure plate 14 are spring elements 58 and 59 which are secured thereto by rivets, screws or other fastening means preferably at the center of the springs. In the embodiment shown, leaf springs have been provided which are adapted to be engaged in channels 56 and 57 which provide guiding means therefor. Since these springs are leaf springs and are secured only at the center portion thereof to pressure plate 14 it will be seen that said springs may adjust rotatably to fit easily within said channels and be compressed upon further insertion thereinto to provide a biasing pressure against the top of said housing.

In operation of this embodiment gaskets 13 and 17 are positioned upon shoulders 12 and 16 respectively and pressure plate 14 is positioned thereupon as indicated generally in Figure 1. This assembly is then inserted into the open end of housing 30, pressure being applied to compress springs 58 and 59 thus making a sealed system simultaneously as the filter element is being inserted.

Closure plate 37 is then assembled to said housing, utilizing gasket 40 therebetween which completes the closed pressure type fluid filtering system.

When it is desired to open the system to clean or replace filter element 10 it is merely necessary to remove closure plate 37, and remove filter 10 from housing 30 by pulling on string, wire, or the like 60 which is secured to the filter element 30 by means of main handle 61.

Since this system is a closed pressure system, it follows that the filter housing and filter element therein may be mounted in any position, horizontal, vertical, or sideways making no difference as far as the operation of the device is concerned. The horizontal type mounting as shown is preferred; however, since it facilitates the easy removal and cleaning of the inside of filter housing 30.

Referring now to the embodiment shown in Fig. 3 it will be seen that there is provided generally at 70 a filter device similar to that shown at 10 in Fig. 2. This filter element consists of can 71 which is open at both ends, the lower ends of which are bent at right angles to the walls at 72 to form flanges 73 upon which gasket 74 may rest. Frictionally engaged within said can 71 and resting upon the inner surface of flanges 73 is fine mesh screen element 75. This screen is similar to that shown generally at 18 of Fig. 2 and is preferably a 120 mesh fine wire screen.

Resting upon the upper or inner surface of this fine mesh screen 75 is heavy cloth member 76 preferably of heavy felt or the like. A quantity of sand 77 is contained within the can and rests upon the upper surface of felt 76 and is enclosed within said can by means of upper heavy cloth member, preferably felt, 78. On top of this upper felt member 78 and frictionally engaging its surface and the inner surface of can 71 is open mesh heavy wire screen 79.

Exerting a sealing pressure against filter element 71 is pressure plate 80 having an aperture therein similar to that shown in 51 in Fig. 1. This pressure plate is of a diameter which is slightly less than the inner diameter of the filter housing 81 and is provided with spring elements 82 and 83 on the top surface thereof.

This filter element is inserted within housing 81 which may be of square, rectangular, circular or other shape and is provided with cover plate 84 which is secured to housing 81 by means of bolts 85 or the like. To insure a sealing engagement with the body of the housing there is provided a gasket 86 for mounting between said closure plate and the flange surface presented by the top edges of the walls of filter housing 81.

Oil ingress and egress means indicated generally at 87 and 88 are provided in a manner similar to the ingress and egress structure described in regard to Figure 4. Bypass means may also be provided in this modification, and the unit is adapted to be swingably mounted to a fire wall or other mounting surface by means of bracket arm 89 which is hingedly connected by means of hinge 90 to mounting arm 91.

Thus it will be seen that after the fluid ingress and egress conduits are uncoupled from the filter unit, the whole unit may be conveniently swung to and fro to enable it to be positioned so as to provide easy access thereto by one desiring to clean or change the filter element therein.

As described hereinafter, it is an easy matter to clean oil or other fluid material, apart from operating engine systems, using the filter element of this invention, such a cleaning method being shown generally in Fig. 5 of the drawing wherein a filter element 100 is placed within a specially designed bucket, 101, which has an aperture 102 in the bottom thereof and a funneling plate 103 of flexible material adapted to be placed within said bucket to engage the can of said filter element so as to prevent oil from filling the bottom of the bucket cavity. When bucket 101 is placed upon or over a retaining means such as another can or the like, oil which has been used in the lubrication system of an internal combustion engine may be poured into bucket 101 which will then be filtered by gravity through filter element 100 and will be retained by the retainer element (not shown) upon which said bucket is placed. Oil or other fluid filtered in this manner may be recycled through the filter to insure complete removal of foreign matters, the oil being ready after one or more such cyclings to be replaced in the lubrication system of the engine. Oil cleaned in this manner may be used again and again thus obtaining a substantial saving in the price of lubricant necessary to operate the internal combustion engines of farm machinery, automobiles or the like.

Thus, it will be seen that applicant has provided a novel filtering device which accomplishes the objects of the invention and other objects as will be apparent to those skilled in the art. While certain preferred embodiments of the invention have been specifically disclosed, it is understood that the invention is not limited thereto, as many variations will be readily apparent to those skilled in the art, and the invention is to be given the broadest interpetation within the term of the following claims.

Having thus described my invention what I claim is:

1. A filtration device comprising a substantially flat open-ended housing having top, bottom, two sides and a rear wall, a thin filter element horizontally slidably inserted in said housing, closure means sealing the open end of said housing, sealing means positioned between the bottom surface of said filter element and the bottom of said housing, an apertured pressure plate sealingly secured to the upper surface of said filter element, springs secured to the upper surface of said pressure plate between said pressure plate and said housing and fluid ingress and egress means in the top and bottom surfaces respectively of said housing, said filter element comprising an open ended can the bottom edges of which are bent back upon themselves to firmly secure a fine mesh screen across the bottom opening to said can, a heavy cloth element resting on said fine mesh screen, a quantity of substantially pure sand adjacent said cloth element, a second heavy cloth element adjacent said sand, and a wide mesh screen frictionally engaging the side walls of said can and the outer surface of said heavy cloth element whereby said cloth elements and said sand are securely contained within said can.

2. A filtration device as in claim 1 wherein the top edges of said filter can are inwardly flanged at right angles to the walls of said can to provide a sealing shoulder for said pressure plate, and in which said heavy cloth elements are felt and said fine mesh screen is 120 mesh.

3. A filtration device comprising an open ended filter housing, a filter positioned therein, a pressure plate having an aperture therein positioned between the top of said filter and said housing, and mounting means secured to said housing, said housing comprising top, bottom, two sides and a rear wall and having an integral flange member secured to the edges of the housing walls at the open end thereof, a closure plate secured to said flange member, and a sealing gasket positioned between said flange member and said closure plate, a second gasket positioned between the bottom of said filter and the bottom of said housing, said pressure plate comprising a planar member with leaf spring elements mounted on the top surface thereof, inwardly opening channels in the top of said housing extending normally to the plane of said open end substantially to the rear wall of said housing, a third sealing gasket positioned between the bottom surface of said pressure plate and the top surface of said filter, said spring elements on said pressure plate being slidably received within said channels whereby said filter may be inserted into and withdrawn from said housing simultaneously as sealing pressure is applied to the sealing gaskets, and fluid ingress and egress means in the top and bottom surfaces respectively of said housing.

4. A filtration device as in claim 3 in which said ingress and egress means consist of conduits extending into apertures in the top and bottom surfaces respectively of said housing and a filter bypass tube extending from a second aperture in the top surface of said housing and connected into the egress conduit extending from the bottom surface thereof.

5. A filtration device as in claim 4 in which said filter element is comprised of a can open at both ends, the edges of one end of which are inwardly flanged at right angles to said walls to provide a shoulder for supporting said third sealing gasket, the edges of the other end of which are bent back upon themselves to engage the edges of a fine mesh screen which extends across the end of said can, a heavy felt member next adjacent said fine mesh screen, a quantity of sand resting upon said heavy felt and a second heavy felt positioned within said can on top of said sand, a wide mesh heavy wire screen frictionally engaging the side walls of said can and the outer surface of said second felt, whereby said sand and said felts are securely contained in said can.

6. A filtration device as in claim 3 in which said mounting means comprises a bracket arm secured to the rear wall of said housing, and a wall plate hingedly secured to the rearward edge of said bracket arm.

7. A filtering device comprising a can open at both ends, the edges of one end of which are bent back upon themselves and engage the edges of a fine mesh screen which extends across the end of said can, a heavy felt member resting upon said fine mesh screen, a quantity of sand resting upon said heavy felt and a second heavy felt positioned within said can on top of said quantity of sand, and a wide mesh heavy wire screen frictionally engaging the side walls of said can and the outer surfaces of said second felt whereby said sand and said felts are securely contained in said can.

References Cited in the file of this patent
UNITED STATES PATENTS

| | | |
|---|---|---|
| 2,143,044 | Wicks et al. | Jan. 10, 1939 |
| 2,197,522 | Lawrence | Dec. 21, 1954 |